US011869195B2

(12) United States Patent
Zhang

(10) Patent No.: US 11,869,195 B2
(45) Date of Patent: Jan. 9, 2024

(54) TARGET OBJECT CONTROLLING METHOD, APPARATUS, ELECTRONIC DEVICE, AND STORAGE MEDIUM

(71) Applicant: Beijing Bytedance Network Technology Co., Ltd., Beijing (CN)

(72) Inventor: Jiayi Zhang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/882,443

(22) Filed: Aug. 5, 2022

(65) Prior Publication Data

US 2022/0375092 A1 Nov. 24, 2022

Related U.S. Application Data

(63) Continuation of application No. PCT/CN2021/112693, filed on Aug. 16, 2021.

(30) Foreign Application Priority Data

Sep. 7, 2020 (CN) .......................... 202010931355.8

(51) Int. Cl.
*G06T 7/11* (2017.01)
*G06T 7/70* (2017.01)

(52) U.S. Cl.
CPC ................. *G06T 7/11* (2017.01); *G06T 7/70* (2017.01); *G06T 2207/10016* (2013.01)

(58) Field of Classification Search
CPC ..................................... G06T 7/11; G06T 7/70

(Continued)

(56) References Cited

U.S. PATENT DOCUMENTS 10,373,392 B2 8/2019 Christen et al.
2013/0328762 A1 12/2013 McCulloch et al.
(Continued)

FOREIGN PATENT DOCUMENTS

CN 102123194 A 7/2011
CN 102568012 A 7/2012
(Continued)

OTHER PUBLICATIONS

Chinese Notice of Allowance issued in corresponding Chinese Application No. 202010931355.8 dated Oct. 13, 2021.
(Continued)

*Primary Examiner* — Hai Tao Sun
(74) *Attorney, Agent, or Firm* — ARENTFOX SCHIFF LLP

(57) ABSTRACT

A target object controlling method, apparatus (2), electronic device, and storage medium. The method includes in response to a movement control operation triggered for a target object in a real scene image, determining a control direction corresponding to the movement control operation (101); obtaining a photographing direction of the real scene image (102); and controlling the target object to move in the real scene image according to the control direction and the photographing direction (103). The target object controlling method can effectively solve the problem in the prior art that when the photographing direction of the real scene image changes, a direction deviation occurs in controlling the target object to move in the real scene image, and can also effectively improve the operation performance of the target object in the real scene image, bringing a better manipulation experience for a user.

17 Claims, 6 Drawing Sheets

(58) Field of Classification Search
USPC .......................................................... 345/633
See application file for complete search history.

(56) References Cited

U.S. PATENT DOCUMENTS

| | | | |
|---|---|---|---|
| 2016/0089600 A1 | 3/2016 | Mays, III et al. | |
| 2016/0140763 A1* | 5/2016 | Seichter .............. | G06F 3/04812 |
| | | | 345/633 |
| 2019/0091561 A1 | 3/2019 | Li | |
| 2019/0126148 A1 | 5/2019 | Wei | |
| 2021/0118236 A1* | 4/2021 | Hou ....................... | A63F 13/428 |
| 2021/0354039 A1* | 11/2021 | Wan ........................ | A63F 13/20 |

FOREIGN PATENT DOCUMENTS

| | | |
|---|---|---|
| CN | 104077023 A | 10/2014 |
| CN | 104748746 A | 7/2015 |
| CN | 105597311 A | 5/2016 |
| CN | 105955483 A | 9/2016 |
| CN | 106575299 A | 4/2017 |
| CN | 106843681 A | 6/2017 |
| CN | 106843861 A | 6/2017 |
| CN | 108415570 A | 8/2018 |
| CN | 108543309 A | 9/2018 |
| CN | 109754471 A | 5/2019 |
| CN | 109908583 A | 6/2019 |
| CN | 109934931 A | 6/2019 |
| CN | 110764614 A | 2/2020 |
| CN | 111190485 A | 5/2020 |
| CN | 111359200 A | 7/2020 |
| CN | 111408137 A | 7/2020 |
| CN | 111651051 A | 9/2020 |
| CN | 112068703 A | 12/2020 |
| CN | 112148125 A | 12/2020 |
| WO | 2020143146 A1 | 7/2020 |

OTHER PUBLICATIONS

Written Opinion and International Search Report issued in corresponding International Application No. PCT/CN2021/112693, dated Nov. 18, 2021.

Chinese Office Action 1 issued in corresponding Chinese Application No. 202010931355.8, dated Apr. 20, 2021.

Extended European Search Report in EP21863495.4, dated Aug. 7, 2023, 8 pages.

* cited by examiner

TARGET OBJECT CONTROLLING METHOD, APPARATUS, ELECTRONIC DEVICE, AND STORAGE MEDIUM

CROSS-REFERENCE TO RELATED APPLICATION

This application is a continuation of International Application No. PCT/CN2021/112693, filed on Aug. 16, 2021, which claims priority to Chinese Patent Application No. 202010931355.8, filed on Sep. 7, 2020 and titled "Target Object Controlling Method, Apparatus, Electronic Device, and Storage Medium", both of which are hereby incorporated by reference in their entireties.

TECHNICAL FIELD

Embodiments of the present disclosure relates to the field of computers, and in particular to a target object controlling method, apparatus, electronic device, and storage medium.

BACKGROUND

Augmented Reality (AR) technology is a technology that skillfully integrates virtual information with a real world. With the development of AR technology, it is possible to control the movement of a target object in an AR real scene image.

In the prior art, a user can control the target object in the AR real scene image through the AR real scene image provided by a terminal, so that the target object in the real scene image can move under the user's control.

However, when the photographing angle of the AR real scene image is not fixed, a direction deviation may occur in the user's control of movement of the target object, which seriously affects the user's control experience of the target object.

SUMMARY

In view of the above problem, embodiments of the present disclosure provide a target object controlling method, apparatus, electronic device, and storage medium.

In a first aspect, an embodiment of the present disclosure provides a target object controlling method, including:
  in response to a movement control operation triggered for a target object in a real scene image, determining a control direction corresponding to the movement control operation and a photographing direction of the real scene image; and
  controlling the target object to move in the real scene image according to the control direction and the photographing direction.

In a second aspect, an embodiment of the present disclosure provides a target object controlling apparatus, including:
  a processing module, configured to in response to a movement control operation triggered for a target object in a real scene image, determine a control direction corresponding to the movement control operation and a photographing direction of the real scene image; and
  a controlling module, configured to control the target object to move in the real scene image according to the control direction and the photographing direction.

In a third aspect, an embodiment of the present disclosure provides an electrical device, including: at least one processor and a memory;
  the memory stores computer-executable instructions; and
  the at least one processor executes the computer-executable instructions stored in the memory, so that the at least one processor can execute the target object controlling method according to the first aspect and various possible controlling methods related to the first aspect.

In a fourth aspect, an embodiment of the present disclosure provides a non-transitory computer-readable storage medium, the computer-readable storage medium stores computer-executable instructions, which, when executed by a processor, implement the target object controlling method according to the first aspect and various possible controlling methods related to the first aspect.

In a fifth aspect, an embodiment of the present disclosure also provides a computer program product, including computer program instructions, the computer program instructions enable a computer to execute the target object controlling method according to the first aspect and various possible controlling methods related to the first aspect.

In a sixth aspect, an embodiment of the present disclosure also provides a computer program, and when the computer program runs on a computer, the computer executes the target object controlling method according to the first aspect and various possible controlling methods related to the first aspect.

The embodiments of the present disclosure provide a target object controlling method, apparatus, electronic device, and storage medium, involving in response to a movement control operation triggered for a target object in a real scene image, determining a control direction corresponding to the movement control operation; obtaining a photographing direction of the real scene image; and controlling the target object to move in the real scene image according to the control direction and the photographing direction. This makes that the controlling method provided in the embodiments can effectively solve the problem in the prior art that when the photographing direction of the real scene image changes, a deviation in the moving direction will occur when controlling the target object to move in the real scene image; and also can effectively improve operation performance of the target object in the real scene image and bringing a better manipulation experience for the user.

BRIEF DESCRIPTION OF DRAWINGS

In order to illustrate technical solutions in the embodiments of the present disclosure or in the prior art more clearly, the following will briefly introduce the accompanying drawings needed in the description of the embodiments or the prior art. Obviously, the accompanying drawings in the following description are some embodiments of the present disclosure. For those of ordinary skill in the art, other drawings can also be obtained from these drawings without creative labor.

DESCRIPTION OF EMBODIMENTS

In order to make the purposes, technical solutions and advantages of the embodiments of the present disclosure clearer, the technical solutions in the embodiments of the present disclosure will be described clearly and completely below with reference to the accompanying drawings in the embodiments of the present disclosure. Obviously, these described embodiments are some, but not all, embodiments of the present disclosure. Based on the embodiments in the present disclosure, all other embodiments can be obtained by those of ordinary skill in the art without creative work fall within the protection scope of the present disclosure.

Augmented Reality (AR) technology is a technology that skillfully integrates virtual information with the real world. With the development of the AR technology, it is possible to control the movement of the target object in an AR real scene image.

In the prior art, a user can control the target object in the AR real scene image through the AR real scene image provided by a terminal, so that the target object in the real scene image can move under the user's control.

Specifically, the photographing device can provide the terminal with a real scene image obtained by photographing. The user can see the target object to be controlled in the real scene image through the terminal, and use the terminal to initiate a control command to control the target object to move in the real scene image. It should be noted that the target object may be a virtual target object or a solid target object, and the present disclosure will not limit this.

Figure 1:
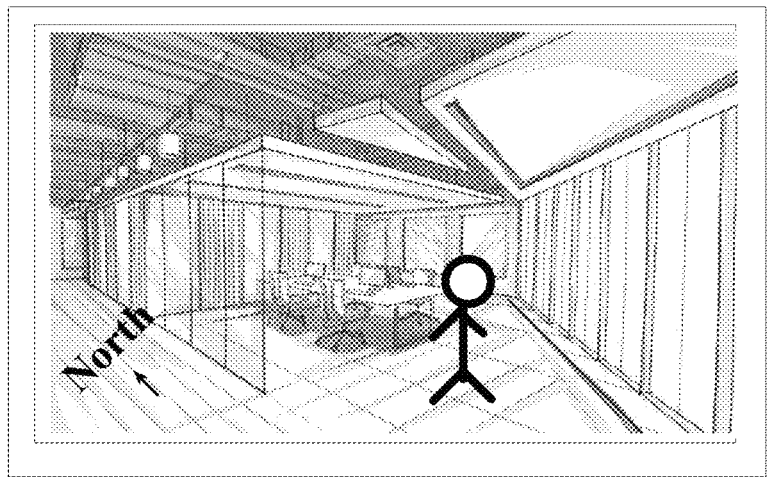
FIG. 1 is a schematic diagram of a control interface of an existing AR game scene.

Taking a control scene based on the target object in the AR game as an example, FIG. 1 is a schematic diagram of a control interface of an existing AR game scene, and through the real scene image provided by a terminal, a user can obtain a game target object representing himself from the real scene image, and a game target object representing others; and through a virtual control provided by the terminal, the user can control his game target object to perform moving, attacking, defending, jumping, rotating and other actions.

In the above movement control process, a direction control of the target object is realized based on a real geographic coordinate system, that is, the control command sent by the terminal can generally make the game target object move based on a direction of "east, south, west and north". That is to say, the user needs to first determine a moving direction of the target object according to a position of the target object in the real scene image, such as "eastward", and then, operate the virtual control on the terminal to initiate a control command for controlling the target object to move "eastward".

However, as shown in FIG. 1, since the user observes and controls the game target object to move through the real scene image, when the photographing angle of the real scene image changes, the user cannot quickly distinguish the position of the game target object in the real scene image and a corresponding moving direction. That is to say, the user thinks the game target object in the real scene image should move "eastward", but in fact, the game target object should move "northward", so the command to initiate moving "eastward" will be obviously different from a moving direction needed actually.

In other words, when the user controls the game target object through the terminal to perform a movement control, there will be a problem of direction deviation, which seriously affects the user's control experience of the game target object.

The above problem not only appears in a scene where the terminal controls the game target object to move, but also in some other application scenes based on virtual augmented reality display technology:

For example, in some scenes displayed in virtual augmented reality, the user can also perform a movement control on some virtual objects displayed in the real scene. For example, virtual objects such as virtual clouds can be added in an obtained real scene of a streetscape, and when adding these virtual objects, the user can control the virtual objects to move to determine addition of positions of these virtual objects. However, in the moving process, the problem of direction deviation caused by the mismatch between the control direction and the moving direction as described above also occurs.

In response to such a problem, according to an embodiment of the present disclosure, such a method is provided that, when responding to a movement control operation triggered for a target object in a real scene image, on one hand, a control direction corresponding to the movement control operation is determined, and on the other hand, a photographing direction of the real scene image is determined, and then a moving direction in the real scene image is determined according to the control direction and the photographing direction, so as to control the target object to move in the real scene image based on the determined moving direction. The controlling method provided in this embodiment can effectively solve the problem in the prior art that when the photographing direction changes, a direction deviation will occur in control of the target object, and also can effectively improve operation performance of the target object in the real scene image and bring a better manipulation experience for the user.

Figure 2:
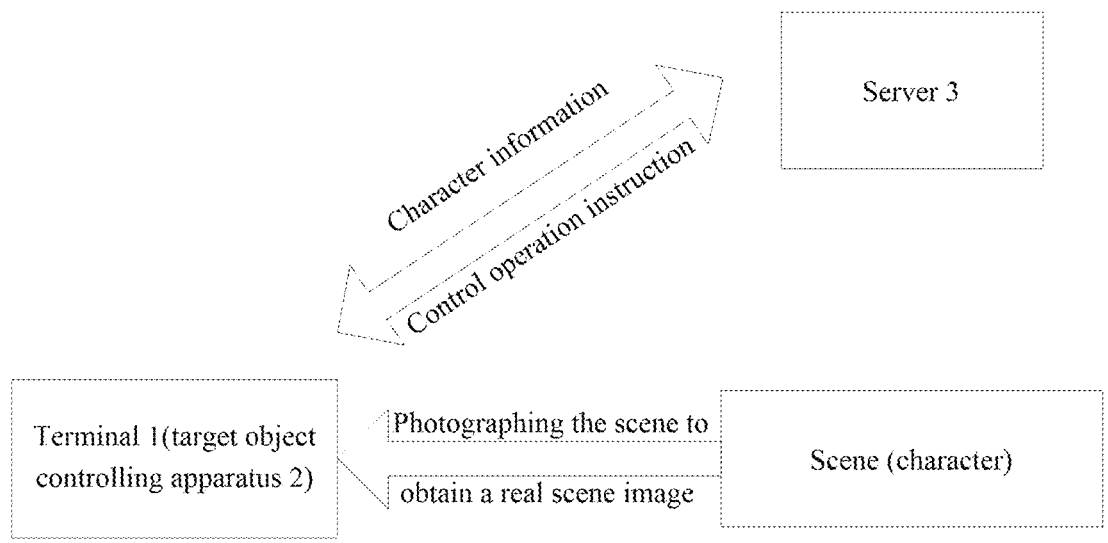
FIG. 2 is a schematic diagram of a network architecture on which the disclosure is based.

Referring to FIG. 2, FIG. 2 is a schematic diagram of a network architecture on which the present disclosure is based. The network architecture shown in FIG. 2 may specifically include a terminal 1, a target object controlling apparatus 2, and a server 3.

Where the terminal 1 may specifically be a hardware device such as a user's mobile phone, a smart household device, a tablet computer and the like that can be used to capture a real scene and display the captured real scene; the target object controlling apparatus 2 may be a client or a display terminal, which is integrated or installed on the terminal 1; and the server 3 may be a server or a server cluster including a game platform, provided in the cloud.

The target object controlling apparatus 2 can run on the terminal 1 and provide the terminal 1 with an operation page, and the terminal 1 uses its display or display component to display the operation page provided by the target object controlling apparatus 2 to the user.

At the same time, the target object controlling apparatus 2 can also interact with the server 3 by using a network component of the terminal 1 to obtain from the server 3 appearance information of the target object, position information of the target object, information of scene where the target object is located, and even some other information resources.

Figure 3:
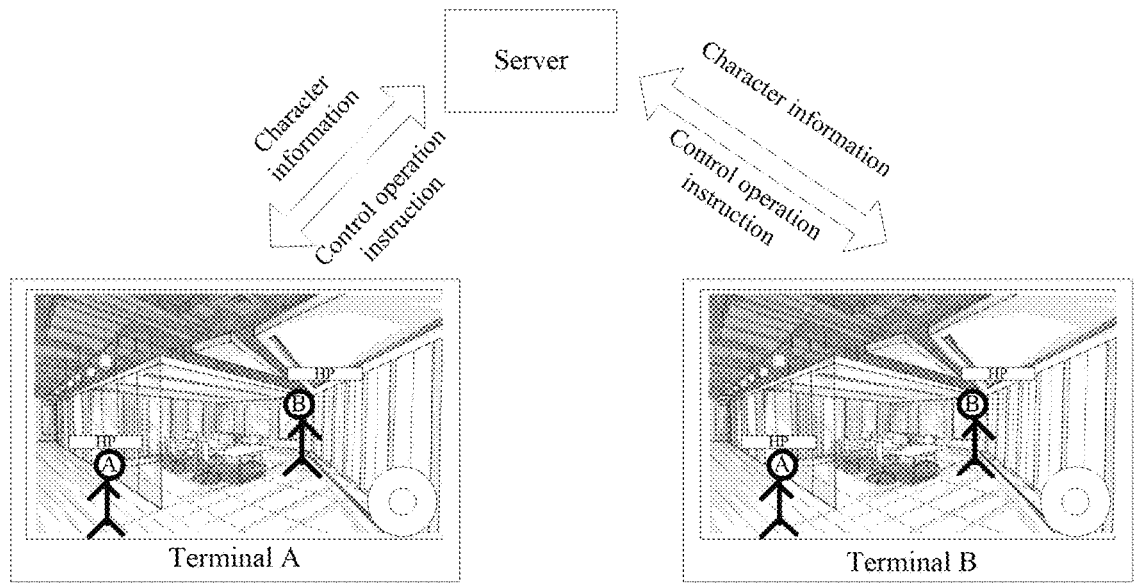
FIG. 3 is a schematic diagram of a scene on which control of a target object is based according to an embodiment of the present disclosure.

In particular, the architecture shown in FIG. 2 is applicable to AR-based game scenes. FIG. 3 is a schematic diagram of a scene on which control of the target object is based in an embodiment of the present disclosure. As shown in FIG. 3, in this scene, user A and user B can each turn on a photographing component or camera of the terminal, and capture the same scene identifier (such as a two-dimensional code as shown in FIG. 3 or a specific item, etc.), so as to establish the communication connection between respective terminals of users A and B and the server 3 in this way. Then, the server 3 will synchronously deliver the data including the virtual scene and the virtual game characters of both them to the target object controlling apparatus 2 of the two users, so that the terminals 1 of the two users construct a game scene on the basis of the real scene image, and display the virtual game characters of both them in the game scene.

With the target object controlling method provided in the present application, a user A can control a virtual game character A through a terminal, and a user B can control a virtual game character B through a terminal, and the control results of both them will be displayed on the terminals of both them synchronously.

Of course, the scene shown in FIG. 3 is only one of the achievable application scenes of the architecture shown in FIG. 2. The embodiments of the present disclosure can also be applied to other scenes, such as a game character treasure hunting scene based on an AR scene, or such as another example is a social scene of AR-based game characters and so on.

In addition, the architecture shown in FIG. 2 can also be applied to the aforementioned scenes displayed in some virtual and augmented reality, and the user can also perform movement control on some virtual objects displayed in the real scene. For example, in an obtained real scene of the streetscape, the user can control, through the method provided by the present disclosure, the movement of a virtual object such as a virtual cloud to be added to determine the addition position thereof. A specific interaction method is similar to the aforementioned scene, and will not be repeated here.

Figure 4:
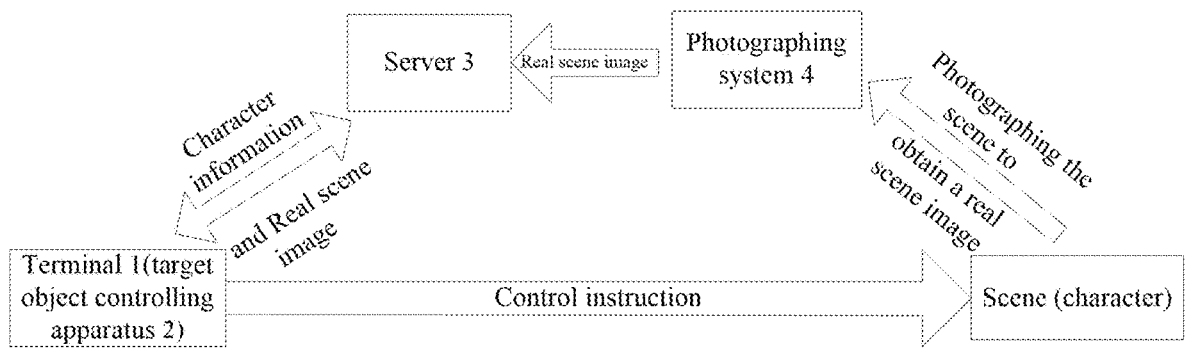
FIG. 4 is a schematic diagram of another network architecture on which the disclosure is based.

In addition, in the controlling method for a target object provided by the present application, the target object may also be a real object. Referring to FIG. 4, FIG. 4 is a schematic diagram of another network architecture on which the present disclosure is based. The network architecture shown in FIG. 4 may specifically include a terminal 1, a target object controlling apparatus 2, a server 3 and a photographing system 4.

Different from the architecture shown in FIG. 2, on the basis of the terminal 1, the target object controlling apparatus 2, and the server 3, the architecture shown in FIG. 4 further includes a photographing system 4.

Where the terminal 1 may be a hardware device such as a user's mobile phone, a smart household device, a tablet computer and the like that can be used to capture the real scene and display the captured real scene; the target object controlling apparatus 2 may be a client or a display terminal, which is integrated or installed on the terminal 1; and the server 3 may be a server or a server cluster including a game platform, provided in the cloud.

The target object controlling apparatus 2 can run on the terminal 1 and provide the terminal 1 with an operation page, and the terminal 1 uses its display or display component to display the operation page provided by the target object controlling apparatus 2 to the user.

At the same time, the target object controlling apparatus 2 can also interact with the server 3 by using a network component of the terminal 1 to obtain from the server 3 appearance information of the game character, position information of the game character, information of scene where the game character is located, and even some other information resources.

Different from FIG. 2, in the structure shown in FIG. 4, the photographing system 4 may be composed of multiple photographing devices arranged in the same photographing area, and the multiple photographing devices will photograph a photographing area at different photographing angles. When the photographing system 4 is photographing the photographing area, a real scene image obtained by photographing will be transmitted to the server 3 and forwarded to the target object controlling apparatus 2 through the server 3 so as to be presented on the terminal 1.

Figures 5, 6:
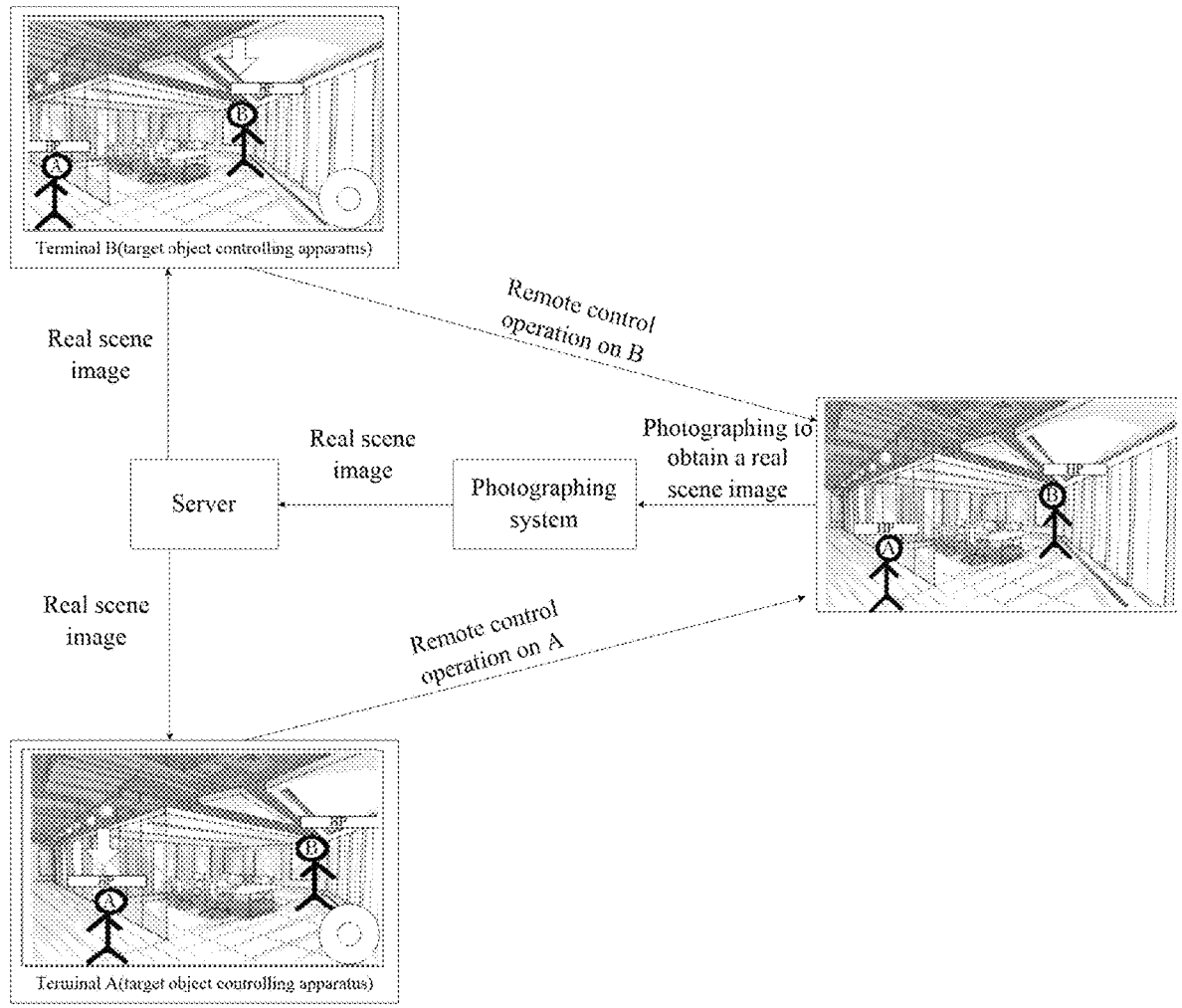
FIG. 5 is a schematic diagram of a scene on which a target object controlling scene in a remote control is based.
FIG. 6 is a schematic flowchart of a target object controlling method according to an embodiment of the present disclosure.

In particular, the architecture shown in FIG. 4 is applicable to a robot scene remotely controlled, where FIG. 5 is a schematic scene diagram that a target object control scene remotely controlled is based on. As shown in FIG. 5, in this scene, robots A and B existing in the real scene can be included.

The photographing system will capture the scene at multiple photographing angles to send the real scene image including the robots to the server. The terminals of user A and user B located at different locations communicate with the server simultaneously to obtain multi-angle real scene images captured by the photographing system.

Then, with the target object controlling method provided in the present application, the user A can remotely control the robot A through the terminal, and the user B can remotely control the robot B through the terminal.

In the control process, the target object controlling apparatus integrated on the terminal will use the control method provided by the present application to determine a moving direction of the robot based on a photographing angle of the real scene image captured by the photographing system and a control direction in the remote control triggered by the user, and then robot A and robot B will perform corresponding actions according to the remote control commands that they have received.

Finally, the execution of the remote control commands by the robot A and the robot B will be presented to the terminals synchronously by the real scene images captured by the photographing system, so as to be obtained by the user A and the user B.

Of course, the scene shown in FIG. 5 is only one of the achievable application scenes of the architecture shown in FIG. 4, the embodiments of the present disclosure can also be applied to other scenes, such as engineering robot scene based on remote control, etc.

The following will further describe the target object controlling method of provided by the present application.

In a first aspect, referring to FIG. 6, FIG. 6 is a schematic flowchart of a target object controlling method according to an embodiment of the present disclosure. The target object controlling method provided by the embodiment of the present disclosure includes:

S101, in response to a movement control operation triggered for a target object in a real scene image, determining a control direction corresponding to the movement control operation;

S102, obtaining a photographing direction of the real scene image; and

S103, controlling the target object to move in the real scene image according to the control direction and the photographing direction.

It should be noted that an execution entity of the processing method provided in this embodiment is the aforementioned target object controlling apparatus. In some embodiments of the present disclosure, it specifically refers to a client or display that can be installed or integrated on a terminal. The target object controlling apparatus can be presented to the user via an application interface or a control display interface. The user can interact with the server in the cloud through the terminal to control the target object in the scene.

On the terminal, a real scene image will be presented through the target object controlling apparatus, and a virtual control for controlling the movement of the target object (components shown in the lower right corners of the terminal interfaces as shown in FIG. 3 or FIG. 5) will be provided synchronously. The users can control the virtual control through different touch methods such as clicking, sliding, pressing, etc., based on their needs, so as to trigger the movement control operation of the target object in the real scene image.

Different from the prior art, in the solution on which the present disclosure is based, after receiving a movement control operation, the target object controlling apparatus determines a control direction corresponding to the movement control operation and a photographing direction of the real scene image, and then controls the target object to move in the real scene image according to the control direction and the photographing direction.

Where the above-mentioned photographing direction is used to indicate an orientation of a photographing device for capturing the real scene image in a geographic coordinate system; and the control direction is used to indicate an operation direction of the movement control operation in an image orthogonal coordinate system.

Specifically, an implementation of controlling the target object to move in the real scene image according to the control direction and the photographing direction can be based on a direction fusion processing, that is, a direction fusion processing is performed on the control direction and the photographing direction to obtain a moving direction of the target object, so as to control the target object to move along the moving direction.

Further, when performing the direction fusion processing, it can be realized based on an alpha blending technology in which a direction angle of the moving direction is obtained by subtracting a direction angle of the photographing direction from a direction angle of the control direction, and then based on the direction angle of the moving direction, the target object is controlled to move along the moving direction.

Where the control direction will be orthogonal to the terminal itself, that is, the direction angle of the control direction is based on the image orthogonal coordinate system, and should be an operation orientation based on the image orthogonal coordinate system.

The photographing direction refers to a pointing direction of a photographing device for capturing the real scene image in a geographic coordinate system. Correspondingly, the direction angle of the photographing direction can be the pointing direction of the photographing device on the horizontal plane based on the geographic coordinate system.

As for the obtaining of the photographing direction, information of a sensor, that is, a pose sensor set on the photographing device/terminal, can be used to determine a pose state of the photographing device/terminal, and then the photographing direction is obtained. That is, determining the photographing direction of the real scene image includes: obtaining a pose state of a photographing device that captures the real scene image; and determining the photographing direction according to the pose state.

The obtaining of the control direction can be realized through a virtual control. Specifically, in the controlling method provided by the present disclosure, a virtual control is also presented on the display interface, and the virtual control is used to receive the movement control operation to control the movement of the target object.

The obtaining of the control direction may be determined based on a current form of the virtual control, where the form of the virtual control refers to a shape and state of the virtual control. In terms of implementation, a current form of the virtual control can be determined first, and then the control direction can be obtained according to the current form of the virtual control.

In this embodiment, two different virtual controls are provided, and the virtual controls can be set at the lower right of the interface as illustrated in FIG. 3 or FIG. 5 to facilitate operation of the user, so as to control the target object in the interface.

The following will describe the obtaining of the control direction based on different virtual controls.

Firstly, the virtual control is a virtual rocker, and the virtual rocker includes a rocker plate and a rocker.

Figure 7:
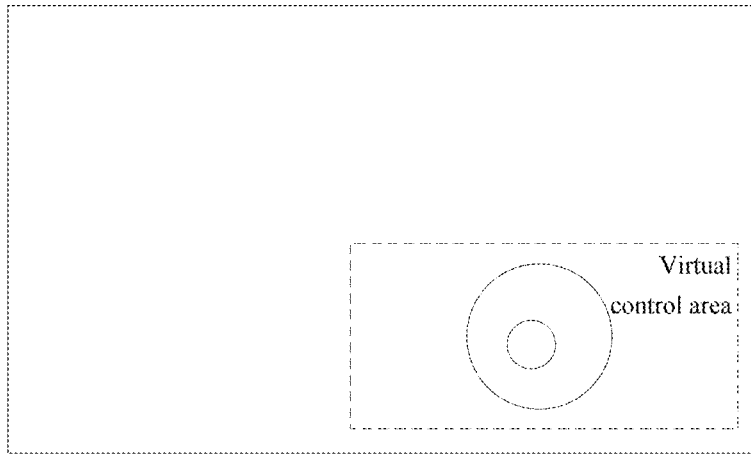
FIG. 7 is a schematic diagram of a first interface for obtaining a control direction according to an embodiment of the present application.

FIG. 7 is a schematic diagram of a first interface for obtaining a control direction provided by an embodiment of the present application. As shown in FIG. 7, the virtual control in the figure is a virtual rocker. When determining the control direction, a relative positional relationship between the rocker and the rocker plate may be determined, and then the control direction is determined according to the relative positional relationship. Specifically, the relative positional relationship between the rocker and the rocker plate can be achieved by the following methods, for example: obtaining the coordinates of the center points of the rocker and the rocker plate respectively, and determining the relative positional relationship by a vector difference between the coordinates of the center points of the rocker and the rocker plate; for another example, determining an overlapping area between the rocker and the rocker plate, and determining a distance between an area edge of the overlapping area and an area edge of an area occupied by the virtual control, and then determining the relative positional relationship according to the distance. Of course, it can also be obtained in other way, and this embodiment does not limit this.

Secondly, the virtual control is a virtual key, and the virtual key includes at least two direction keys.

Figure 8:
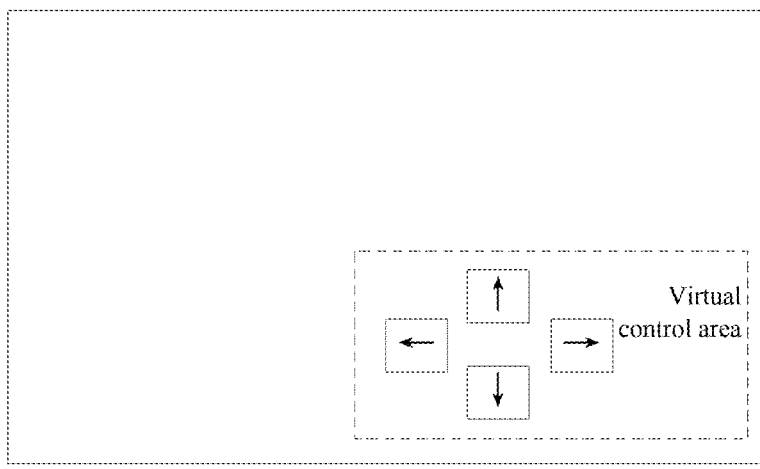
FIG. 8 is a schematic diagram of a second interface for obtaining a control direction according to an embodiment of the present application.

FIG. 8 is a schematic diagram of a second interface for obtaining a control direction provided by an embodiment of the present application. As shown in FIG. 8, the virtual control in the figure is a virtual key. When determining the control direction, a triggered direction key can be determined; according to the direction corresponding to the triggered direction key, the control direction is determined.

The determination of the triggered direction key can be realized through an existing touch technology, which will not be described in detail in this application.

Figure 9A:
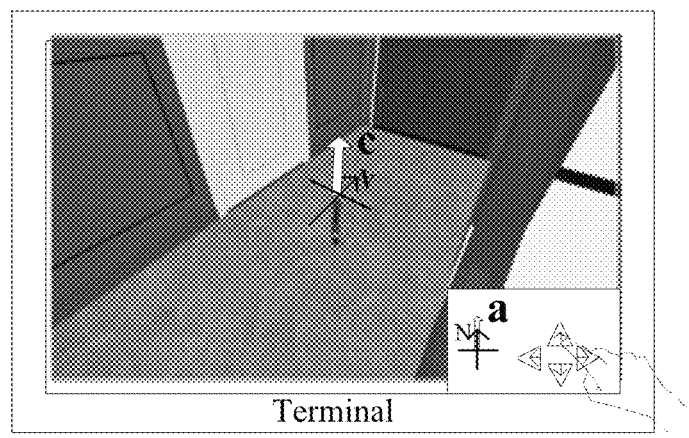
FIG. 9*a* is a schematic diagram of a terminal perspective through a first direction fusion according to an embodiment of the present application.
Figure 9B:
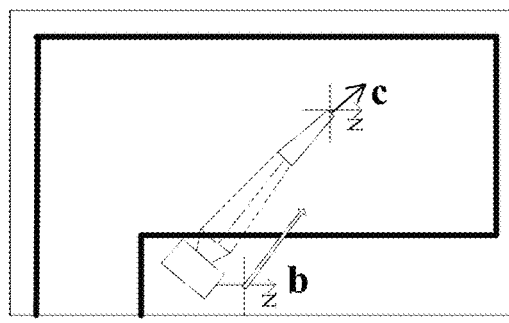
FIG. 9*b* is a top view of a scene through a first direction fusion according to an embodiment of the present application.
Figure 9C:
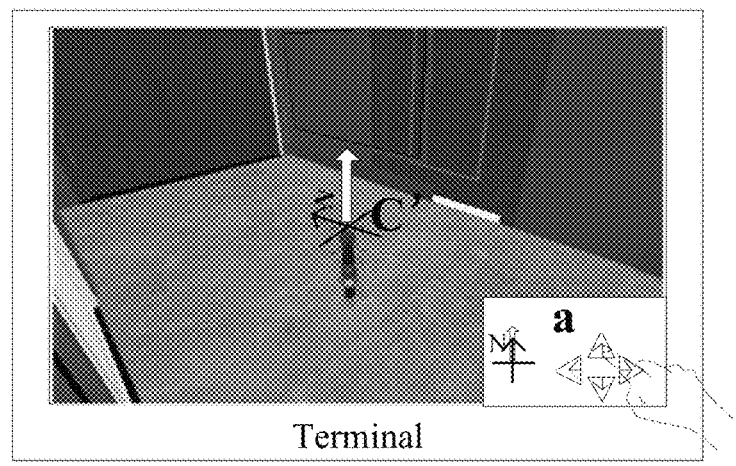
FIG. 9*c* is a schematic diagram of a terminal perspective through a second direction fusion according to an embodiment of the present application.
Figure 9D:
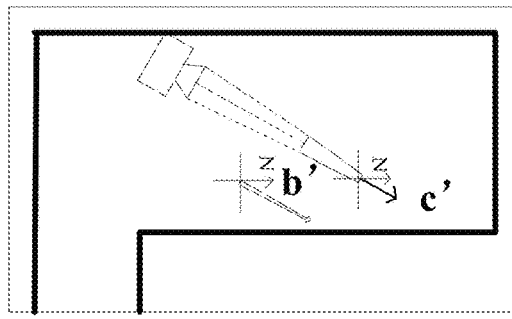
FIG. 9*d* is a top view of a scene through a second direction fusion according to an embodiment of the present application.

FIG. 9a is a schematic diagram of a terminal perspective through a first direction fusion provided according to an embodiment of the application, FIG. 9b is a top view of a scene through a first direction fusion provided by an embodiment of the present application, FIG. 9c is a schematic diagram of a terminal perspective through a second direction fusion provided by an embodiment of the present application; and FIG. 9d is a top view of a scene through a second direction fusion provided by an embodiment of the present application. As shown in FIGS. 9a-9d, the control direction a and the photographing direction b (b') can be determined respectively through the above method, and the moving direction c (c') can be obtained through fusion, and the terminal controls the target object to move based on the moving direction c (c').

Specifically, FIGS. 9a-9d show a process of controlling the target object "motorcycle" to move in the real scene through the terminal.

FIG. 9b shows the photographing direction b of the terminal and the moving direction c of the motorcycle, and FIG. 9a shows an interface of a terminal perspective in the state of FIG. 9b.

In FIG. 9a and FIG. 9b, when the user triggers the virtual control to control the motorcycle to move towards "North (N)", the control direction is a, and the controlling method provided by the present disclosure will be used in combination with the photographing direction b of the terminal in the real geographic coordinate system, to determine the movement direction c of the motorcycle in the real geographic coordinate system.

Subsequently, in FIG. 9c and FIG. 9d, a scene where the control direction a is not changed and the photographing direction b is changed is shown. Where FIG. 9d shows the photographing direction b' of the terminal and the moving direction c' of the motorcycle, and FIG. 9c shows an interface of a terminal perspective in the state of FIG. 9b.

In FIG. 9c and FIG. 9d, the photographing direction of the terminal in the real geographic coordinate system changes from b to b', while the control direction a does not change.

That is to say, when the user triggers the virtual control and still controls the motorcycle to move towards "north (N)", the control direction is a, and due to change of the photographing direction, the movement direction of the motorcycle in the real geographic coordinate system will also be changed to c'.

Of course, in other embodiments, the moving speed of the target object can also be controlled during the moving process. Specifically, the target object controlling apparatus can obtain a moving speed of the target object according to the current form of the virtual control, and control the target object to move based on the moving speed.

Specifically, when determining the moving speed based on the current form of the virtual control, it can be realized based on a force with which the virtual control is pressed, or it can be realized based on a change speed of the virtual control when the form of the virtual control changes. The present application does not describe this in detail.

The target object controlling method provided in the embodiments of the present disclosure involves, by responding to a movement control operation triggered for a target object in a real scene image, determining a control direction corresponding to the movement control operation and a photographing direction of the real scene image; and controlling the target object to move in the real scene image according to the control direction and the photographing direction, where the embodiments determine a moving direction of the target object in the real scene image according to the photographing direction of the real scene image and the control direction corresponding to the movement control operation. In this way, the problem in the prior art that a direction deviation in control of the target object occurs when the photographing direction changes is effectively solved and the operation performance of the target object in the real scene image is effectively improved, bringing a better manipulation experience for the user.

Figure 10:
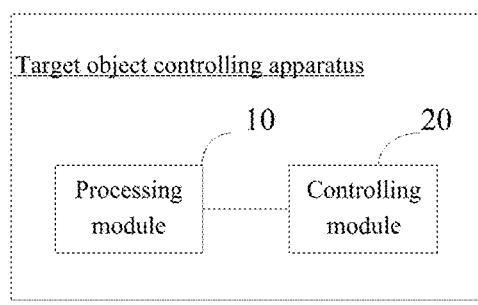
FIG. 10 is a structural block diagram of a target object controlling apparatus according to an embodiment of the present disclosure.

Corresponding to the target object controlling method in the above embodiment, FIG. 10 is a structural block diagram of a target object controlling apparatus provided by an embodiment of the present disclosure. For convenience of explanation, only parts related to this embodiment of the present disclosure are shown. Referring to FIG. 10, the target object controlling apparatus includes: a processing module 10 and a controlling module 20.

The processing module 10 is configured to in response to a movement control operation triggered for a target object in a real scene image, determine a control direction corresponding to the movement control operation; and obtain a photographing direction of the real scene image; and the controlling module 20 is configured to control the target object to move in the real scene image according to the control direction and the photographing direction.

In an optional embodiment, the photographing direction is used to indicate a pointing direction of a photographing device for capturing the real scene image in a geographic coordinate system; and the control direction is used to indicate an operation direction of the movement control operation in an image orthogonal coordinate system.

In an optional embodiment, the processing module 10 is specifically configured to obtain a pose state of the photographing device for capturing the real scene image; and determine the photographing direction according to the pose state.

In an optional embodiment, it also includes providing a virtual control, wherein the virtual control is used to receive the movement control operation so as to control the target object to move;

the processing module 10 is specifically configured to determine a current form of the virtual control, and obtain the control direction according to the current form of the virtual control.

In an optional embodiment, the virtual control includes a virtual rocker, and the virtual rocker includes a rocker plate and a rocker located in the rocker plate.

In an optional embodiment, the processing module 10 is specifically configured to determine a relative positional relationship between the rocker and the rocker plate; and determine the control direction according to the relative positional relationship.

In an optional embodiment, the virtual control includes a virtual key, and the virtual key includes at least two direction keys.

In an optional embodiment, the processing module 10 is specifically configured to determine a triggered direction key; determine the control direction according to a direction corresponding to the triggered direction key.

In an optional embodiment, the controlling module 20 is specifically configured to perform a direction fusion processing on the control direction and the photographing direction to obtain a moving direction of the target object; control the target object to move along the moving direction.

In an optional embodiment, the processing module 10 is further configured to obtain a moving speed of the target object according to the current form of the virtual control; and the controlling module 20 is specifically configured to control the target object to move based on the moving speed.

The target object controlling apparatus provided in the embodiments of the present disclosure involves, by responding to a movement control operation triggered for a target object in a real scene image, determining a control direction corresponding to the movement control operation and a photographing direction of the real scene image; and controlling the target object to move in the real scene image according to the control direction and the photographing direction, where the embodiments determine a moving direction of the target object in the real scene image according to the photographing direction of the real scene image and the control direction corresponding to the movement control operation. In this way, the problem in the prior art that a direction deviation in control of the target object occurs when the photographing direction changes is effectively solved and the target object operation performance in the real scene image is effectively improved, bringing a better manipulation experience for the user.

The electronic device provided in this embodiment can be used to implement the technical solutions of the foregoing method embodiments, and the implementation principles and technical effects thereof are similar to those of the foregoing method embodiments, and details are not described here again in this embodiment.

Figure 11:
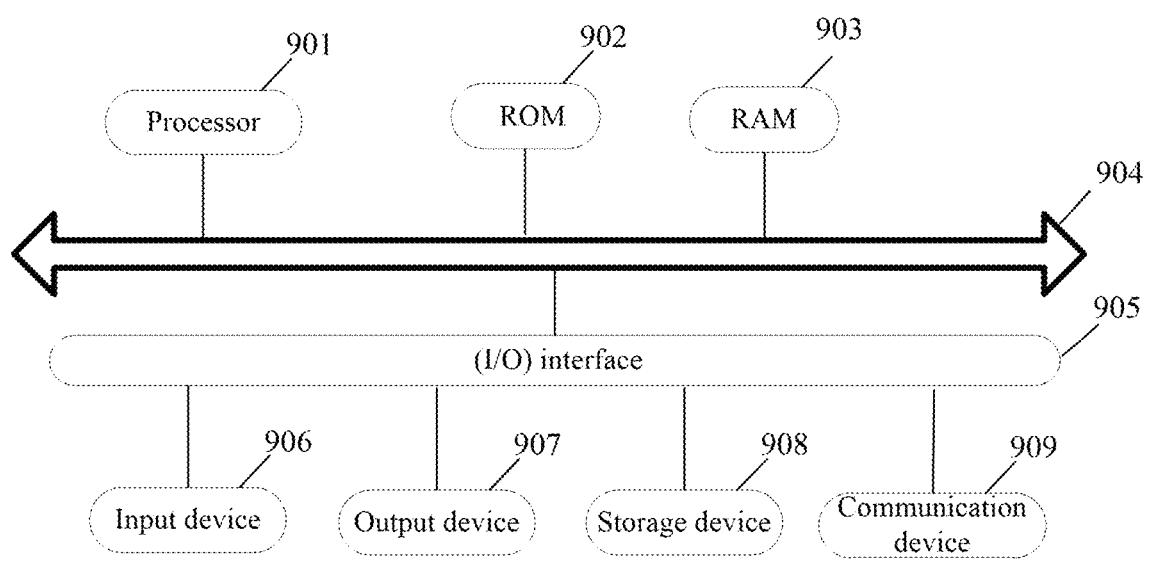
FIG. 11 is a schematic diagram of a hardware structure of an electronic device according to an embodiment of the present disclosure.

Referring to FIG. 11, FIG. 11 shows a schematic structural diagram of an electronic device suitable for implementing an embodiment of the present disclosure. The electronic device may be a terminal device or a media library. The terminal device may include, but is not limited to, mobile terminals such as mobile phones, notebook computers, digital broadcast receivers, personal digital assistants (PDA for short), portable android device (PAD for short), portable media player (PMP for short), in-vehicle terminals (e.g., in-vehicle navigation terminals), and the like, and stationary terminals such as digital TVs, desktop computers, and the like. The electronic device shown in FIG. 11 is only an example, and should not impose any limitations on the functions and use range of the embodiments of the present disclosure.

As shown in FIG. 11, the electronic device may include a processor 901 for executing a target object controlling method (e.g., a central processor, a graphics processor, etc.), the processor 901 may execute various appropriate actions and processes according to a program stored in a read only memory (ROM for short) 902 or a program loaded from a storage device 908 into a random access memory (RAM for short) 903. In the RAM 903, various programs and data necessary for the operation of the electronic device are also stored. The processor 901, the ROM 902 and the RAM 903 are connected to each other through a bus 904. An input/output (I/O) interface 905 is also connected to the bus 904.

Generally, the following devices can be connected to the I/O interface 905: an input device 906 including, for example, a touch screen, a touch pad, a keyboard, a mouse, a camera, a microphone, an accelerometer, a gyroscope, etc.; an output device 907 including, for example, a liquid crystal display (LCD for short), a speaker, a vibrator, etc.; a storage device 908 including, for example, a magnetic tape, a hard disk, etc.; and a communication device 909. The communication device 909 may allow the electronic device to carry out wireless or wired communication with other device so as to exchange data. Although FIG. 11 shows an electronic device having various devices, it should be understood that not all of the illustrated devices are required to be implemented or equipped. Alternatively, more or less devices may be implemented or equipped.

In particular, according to embodiments of the present disclosure, the processes described above with reference to the flowcharts may be implemented as a computer software program. For example, an embodiment of the present disclosure includes a computer program product including a computer program carried on a computer-readable medium, and the computer program includes a program code for executing the methods shown in each flowchart according to the embodiments of the present disclosure. In such an embodiment, the computer program may be downloaded from the network via the communication device 909 and installed, or may installed from the storage device 908, or may installed from the ROM 902. When the computer program is executed by the processor 901, the above-mentioned functions defined in the methods of the embodiments of the present disclosure are executed.

It should be noted that the computer-readable medium mentioned above in the present disclosure may be a computer-readable signal medium or a computer-readable storage medium, or any combination of the above two. The computer readable storage medium can be, for example, but is not limited to, an electrical, a magnetic, an optical, an electromagnetic, an infrared, or a semiconductor system, apparatus or device, or any combination of the above. More specific examples of the computer readable storage medium may include, but are not limited to, an electrical connection with one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the above. In the present disclosure, a computer-readable storage medium may be any tangible medium that contains or stores a program, the program can be used by or in conjunction with an instruction execution system, an apparatus, or a device. And in the present disclosure, a computer-readable signal medium may include a data signal propagated in baseband or as part of a carrier wave, and computer-readable program codes are embodied thereon. Such propagated data signals may take a variety of forms, including but not limited to an electromagnetic signal, an optical signal, or any suitable combination of the foregoing. The computer-readable signal medium can also be any computer-readable medium other than a computer-readable storage medium and can transmit, propagate, or transport the program for use by or in connection with the instruction execution system, apparatus, or device. The program codes embodied on the computer readable medium may be transmitted using any suitable medium including, but not limited to, electrical wire, optical cable, RF (radio frequency), etc., or any suitable combination of the foregoing.

The above-mentioned computer-readable medium may be included in the above-mentioned electronic device; it may also exist individually without being assembled into the electronic device.

The above-mentioned computer-readable medium carries one or more programs, and when the above-mentioned one or more programs are executed by the electronic device, the electronic device is caused to execute the methods shown in the foregoing embodiments.

The present disclosure further provides a computer program, which enables a computer to execute the methods shown in the above embodiments.

Computer program code for carrying out operations of the present disclosure may be written in one or more programming languages, including object-oriented programming languages, such as Java, Smalltalk, C++, as well as conventional procedural programming language, such as the "C" language or similar programming language. The program codes may be executed entirely on the user's computer, partly on the user's computer, as a stand-alone software package, partly on the user's computer and partly on a remote computer, or entirely on a remote computer or medium library. In the case of the remote computer, the remote computer can be connected to the user's computer through any kind of network, including a Local Area Network (LAN) or Wide Area Network (WAN), or it can be connected to an external computer (e.g., using an internet service provider to connect via the internet).

The flowcharts and block diagrams in the accompanying drawings illustrate the architecture, functionality, and operation of possible implementations of systems, methods and computer program products according to various embodiments of the present disclosure. In this regard, each block in the flowcharts or block diagrams may represent part of a module, a program segment, or a code, and the part of the module, the program segment, or the code contains one or more executable instructions for implementing a specified logical function. It should also be noted that, in some alternative implementations, the functions noted in the blocks may occur out of the order noted in the figures. For example, two blocks shown in succession may, in fact, be executed substantially concurrently, or may sometimes be executed in a reverse order, depending upon the function involved. It is also noted that each block of the block diagrams and/or flowchart diagrams, and combinations of blocks in the block diagrams and/or flowchart diagrams, can be implemented by a dedicated hardware-based system that performs a specified function or operation, or can be implemented using a combination of dedicated hardware and computer instructions.

The units involved in the embodiments of the present disclosure may be implemented in a software manner, and may also be implemented in a hardware manner. Where the name of the unit does not constitute a limitation of the unit itself under certain circumstances. For example, a first obtaining unit may also be described as "a unit that obtains at least two internet protocol addresses".

The functions described herein above may be performed, at least in part, by one or more hardware logic components. For example, without limitation, exemplary types of the hardware logic components that may be used include: field-programmable gate array (FPGA), application specific integrated circuit (ASIC), application specific standard products (ASSP), system on a chip (SOC), complex programmable logical device (CPLD), etc.

In the context of the present disclosure, a machine-readable medium may be a tangible medium and may contain or store a program for use by or in connection with the instruction execution system, apparatus or device. The machine-readable medium may be a machine-readable signal medium or a machine-readable storage medium. The machine-readable medium may include, but is not limited to, electronic, magnetic, optical, electromagnetic, infrared, or semiconductor systems, devices, or devices, or any suitable combination of the foregoing. More specific examples of the machine-readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above.

The following are some embodiments of the present disclosure.

In a first aspect, according to one or more embodiments of the present disclosure, there is provided a target object controlling method, including:

in response to a movement control operation triggered for a target object in a real scene image, determining a control direction corresponding to the movement control operation;

obtaining a photographing direction of the real scene image; and controlling the target object to move in the real scene image according to the control direction and the photographing direction.

In an optional embodiment, the photographing direction is used to indicate a pointing direction of a photographing device for capturing the real scene image in a geographic coordinate system; and the control direction is used to indicate an operation direction of the movement control operation in an image orthogonal coordinate system.

In an optional embodiment, the obtaining the photographing direction of the real scene image includes:

obtaining a pose state of the photographing device for capturing the real scene image; and determining the photographing direction according to the pose state.

In an optional embodiment, the controlling method further includes: providing a virtual control, wherein the virtual control is used to receive the movement control operation so as to control the target object to move;

determining the control direction corresponding to the movement control operation includes:

determining a current form of the virtual control and obtaining the control direction according to the current form of the virtual control.

In an optional embodiment, the virtual control includes a virtual rocker, and the virtual rocker includes a rocker plate and a rocker located in the rocker plate.

In an optional embodiment, determining the current form of the virtual control and obtaining the control direction according to the current form of the virtual control includes:

determining a relative positional relationship between the rocker and the rocker plate; and determining the control direction according to the relative positional relationship.

In an optional embodiment, the virtual control includes a virtual key, and the virtual key includes at least two direction keys.

In an optional embodiment, determining the current form of the virtual control and obtaining the control direction according to the current form of the virtual control includes:

determining a triggered direction key; and determining the control direction according to a direction corresponding to the triggered direction key.

In an optional embodiment, controlling the target object to move in the real scene image according to the control direction and the photographing direction includes:

performing a direction fusion processing on the control direction and the photographing direction to obtain a moving direction of the target object; and controlling the target object to move along the moving direction.

In an optional embodiment, the method further includes:

obtaining a moving speed of the target object according to the current form of the virtual control;

correspondingly, controlling the target object to move further includes:

controlling the target object to move based on the moving speed.

In a second aspect, according to one or more embodiments of the present disclosure, there is provided a target object controlling apparatus, including: a processing module and a controlling module.

The processing module is configured to in response to a movement control operation triggered for a target object in a real scene image, determine a control direction corresponding to the movement control operation, and obtain a photographing direction of the real scene image; and the controlling module is configured to control the target object to move in the real scene image according to the control direction and the photographing direction.

In an optional embodiment, the photographing direction is used to indicate a pointing direction of a photographing device for capturing the real scene image in a geographic coordinate system; and the control direction is used to indicate an operation direction of the movement control operation in an image orthogonal coordinate system.

In an optional embodiment, the processing module is specifically configured to obtain a pose state of the photographing device for capturing the real scene image; and determine the photographing direction according to the pose state.

In an optional embodiment, the target object controlling apparatus further includes a virtual control, wherein the virtual control is used to receive the movement control operation so as to control the target object to move; and the processing module is specifically configured to determine a current form of the virtual control, and obtain the control direction according to the current form of the virtual control.

In an optional embodiment, the virtual control includes a virtual rocker, and the virtual rocker includes a rocker plate and a rocker located in the rocker plate.

In an optional embodiment, the processing module is specifically configured to: determine a relative positional relationship between the rocker and the rocker plate; and determine the control direction according to the relative positional relationship.

In an optional embodiment, the virtual control includes a virtual key, and the virtual key includes at least two direction keys.

In an optional embodiment, the processing module is specifically configured to determine a triggered direction key; and determine the control direction according to a direction corresponding to the triggered direction key.

In an optional embodiment, the controlling module is specifically configured to perform a direction fusion processing on the control direction and the photographing direction to obtain a moving direction of the target object; and control the target object to move along the moving direction.

In an optional embodiment, the processing module is further configured to obtain a moving speed of the target object according to the current form of the virtual control; and the controlling module is specifically configured to control the target object to move based on the moving speed.

In a third aspect, according to one or more embodiments of the present disclosure, there is provided an electronic device, including: at least one processor and a memory;

the memory stores computer-executable instructions;

the at least one processor executes the computer-executable instructions stored in the memory, so that the at least one processor executes any one of the above-mentioned target object controlling methods.

In a fourth aspect, according to one or more embodiments of the present disclosure, there is provided a non-transitory computer-readable storage medium, the computer-readable storage medium stores computer-executable instructions that, when executed by a processor, implement any one of the above-mentioned target object controlling methods.

In a fifth aspect, according to one or more embodiments of the present disclosure, there is provided a computer program product including computer program instructions, the computer program instructions causing a computer to execute any one of the above target object controlling methods.

In a sixth aspect, according to one or more embodiments of the present disclosure, there is provided a computer program that, when running on a computer, causes a computer to execute any one of the above target object controlling methods.

The above descriptions are merely preferred embodiments of the present disclosure and illustrations of the technical principles employed. Those skilled in the art should understand that the scope of disclosure involved in the present disclosure is not limited to the technical solutions formed by specific combinations of the above-mentioned technical features, and should cover, without departing from the above-mentioned disclosed concept, other technical solutions formed by any combination of the above-mentioned technical features or equivalent features thereof. For example, a technical solution is formed by replacing the above features with the technical features disclosed in the present disclosure (but not limited to those) with similar functions.

Additionally, although operations are depicted in a particular order, this should not be construed as requiring that the operations are performed in the particular order shown or in a sequential order. Under certain circumstances, multitasking and parallel processing may be advantageous. Likewise, although the above discussion contains several specific implementation details, these should not be construed as limitations on the scope of the present disclosure. Certain features that are described in the context of separate embodiments can also be implemented in combination in a single embodiment. Conversely, various features that are described in the context of a single embodiment can also be implemented in multiple embodiments separately or in any suitable subcombination.

Although the subject matter has been described in language specific to structural features and/or logical actions of method, it should be understood that the subject matter defined in the appended claims is not necessarily limited to specific features or actions described above. Rather, the specific features and actions described above are merely examples of implementing the claims.

What is claimed is:

1. A target object controlling method, comprising:
in response to a movement control operation triggered for a target object in a real scene image, determining a control direction corresponding to the movement control operation;
obtaining a photographing direction of the real scene image; and
controlling the target object to move in the real scene image according to the control direction and the photographing direction;
wherein controlling the target object to move in the real scene image according to the control direction and the photographing direction comprises:
performing a direction fusion processing on the control direction and the photographing direction to obtain a moving direction of the target object; and
controlling the target object to move along the moving direction;
wherein performing a direction fusion processing on the control direction and the photographing direction to obtain a moving direction of the target object, and controlling the target object to move along the moving direction comprises:
realizing the direction fusion processing based on an alpha blending technology, wherein a direction angle of the moving direction is obtained by subtracting a direction angle of the photographing direction from a direction angle of the control direction; and
controlling the target object to move along the moving direction based on the direction angle of the moving direction.

2. The target object controlling method according to claim 1, wherein the photographing direction is used to indicate a pointing direction of a photographing device for capturing the real scene image in a geographic coordinate system; and
the control direction is used to indicate an operation direction of the movement control operation in an image orthogonal coordinate system.

3. The target object controlling method according to claim 1, wherein obtaining the photographing direction of the real scene image comprises:
obtaining a pose state of a photographing device for capturing the real scene image; and
determining the photographing direction according to the pose state.

4. The target object controlling method according to claim 1, wherein the controlling method further comprises: providing a virtual control, wherein the virtual control is used to receive the movement control operation so as to control the target object to move;
determining the control direction corresponding to the movement control operation comprises:
determining a current form of the virtual control and obtaining the control direction according to the current form of the virtual control.

5. The target object controlling method according to claim 4, wherein the virtual control comprises a virtual rocker, and the virtual rocker comprises a rocker plate and a rocker located in the rocker plate.

6. The target object controlling method according to claim 5, wherein determining the current form of the virtual control and obtaining the control direction according to the current form of the virtual control comprises:
determining a relative positional relationship between the rocker and the rocker plate; and
determining the control direction according to the relative positional relationship.

7. The target object controlling method according to claim 4, wherein the virtual control comprises a virtual key, and the virtual key comprises at least two direction keys.

8. The target object controlling method according to claim 4, further comprising:
obtaining a moving speed of the target object according to the current form of the virtual control;
correspondingly, controlling the target object to move further comprises:
controlling the target object to move based on the moving speed.

9. An electronic device, comprising:
at least one processor; and
a memory;
wherein the memory stores computer-executable instructions; and
the at least one processor executes the computer-executable instructions stored in the memory, to enable the at least one processor to:
in response to a movement control operation triggered for a target object in a real scene image, determine a control direction corresponding to the movement control operation;
obtain a photographing direction of the real scene image; and
control the target object to move in the real scene image according to the control direction and the photographing direction;
wherein the at least one processor is further enabled to:
perform a direction fusion processing on the control direction and the photographing direction to obtain a moving direction of the target object; and
control the target object to move along the moving direction;
wherein the at least one processor is further enabled to:
realize the direction fusion processing based on an alpha blending technology, wherein a direction angle of the moving direction is obtained by subtracting a direction angle of the photographing direction from a direction angle of the control direction; and
control the target object to move along the moving direction based on the direction angle of the moving direction.

10. The electronic device according to claim 9, wherein the photographing direction is used to indicate a pointing direction of a photographing device for capturing the real scene image in a geographic coordinate system; and
the control direction is used to indicate an operation direction of the movement control operation in an image orthogonal coordinate system.

11. The electronic device according to claim 9, wherein the at least one processor is further enabled to:

obtain a pose state of a photographing device for capturing the real scene image; and determine the photographing direction according to the pose state.

12. The electronic device according to claim 9, wherein the at least one processor is further enabled to:

provide a virtual control, wherein the virtual control is used to receive the movement control operation so as to control the target object to move; and determine a current form of the virtual control and obtain the control direction according to the current form of the virtual control.

13. The electronic device according to claim 12, wherein the virtual control comprises a virtual rocker, and the virtual rocker comprises a rocker plate and a rocker located in the rocker plate.

14. The electronic device according to claim 13, wherein the at least one processor is further enabled to:

determine a relative positional relationship between the rocker and the rocker plate; and determine the control direction according to the relative positional relationship.

15. The electronic device according to claim 12, wherein the virtual control comprises a virtual key, and the virtual key comprises at least two direction keys.

16. The electronic device according to claim 15, wherein the at least one processor is further enabled to:

determine a triggered direction key; and determine the control direction according to a direction corresponding to the triggered direction key.

17. A non-transitory computer-readable storage medium, wherein the computer-readable storage medium stores computer-executable instructions that, when executed by a processor, enable the processor to:

in response to a movement control operation triggered for a target object in a real scene image, determine a control direction corresponding to the movement control operation;

obtain a photographing direction of the real scene image; and control the target object to move in the real scene image according to the control direction and the photographing direction;

wherein the computer-executable instructions are further configured to enable the processor to:

perform a direction fusion processing on the control direction and the photographing direction to obtain a moving direction of the target object; and control the target object to move along the moving direction;

wherein the computer-executable instructions are further configured to enable the processor to:

realize the direction fusion processing based on an alpha blending technology, wherein a direction angle of the moving direction is obtained by subtracting a direction angle of the photographing direction from a direction angle of the control direction; and control the target object to move along the moving direction based on the direction angle of the moving direction.

* * * * *